United States Patent
Frieder et al.

(10) Patent No.: US 7,299,496 B2
(45) Date of Patent: Nov. 20, 2007

(54) DETECTION OF MISUSE OF AUTHORIZED ACCESS IN AN INFORMATION RETRIEVAL SYSTEM

(75) Inventors: Ophir Frieder, Chicago, IL (US); David Adam Grossman, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 1153 days.

(21) Appl. No.: 09/929,094

(22) Filed: Aug. 14, 2001

(65) Prior Publication Data

US 2003/0037251 A1 Feb. 20, 2003

(51) Int. Cl.
- *G06F 11/00* (2006.01)
- *G06F 12/14* (2006.01)
- *G06F 12/16* (2006.01)
- *G06F 15/18* (2006.01)
- *G06F 11/30* (2006.01)
- *G08B 23/00* (2006.01)
- *H04L 9/32* (2006.01)

(52) U.S. Cl. .................................. 726/23; 713/193
(58) Field of Classification Search ................ 713/193
See application file for complete search history.

(56) References Cited

U.S. PATENT DOCUMENTS

| | | | |
|---|---|---|---|
| 4,773,028 A | 9/1988 | Tallman .................. 714/736 |
| 5,212,639 A | 5/1993 | Sampson et al. .......... 705/30 |
| 5,475,625 A | 12/1995 | Glaschick .............. 709/224 |
| 5,557,742 A | 9/1996 | Smaha et al. ............. 726/22 |
| 5,621,889 A * | 4/1997 | Lermuzeaux et al. ...... 726/22 |
| 5,796,942 A | 8/1998 | Esbensen ................. 726/13 |
| 5,832,182 A * | 11/1998 | Zhang et al. ............. 706/50 |
| 5,909,589 A * | 6/1999 | Parker et al. ............ 712/32 |
| 5,915,019 A | 6/1999 | Ginter et al. ............ 705/54 |
| 5,991,881 A | 11/1999 | Conklin et al. ........... 726/22 |
| 6,029,144 A | 2/2000 | Barrett et al. ............ 705/30 |
| 6,049,876 A | 4/2000 | Moughanni et al. ........ 726/26 |
| 6,058,392 A | 5/2000 | Sampson et al. ............ 707/6 |
| 6,088,804 A | 7/2000 | Hill et al. ............... 726/25 |
| 6,119,236 A | 9/2000 | Shipley .................. 726/22 |
| 6,134,664 A | 10/2000 | Walker .................. 726/22 |
| 6,201,948 B1 | 3/2001 | Cook et al. ............. 434/350 |
| 6,370,525 B1 * | 4/2002 | Kaufman .................. 707/3 |
| 6,446,035 B1 * | 9/2002 | Grefenstette et al. ...... 704/1 |
| 6,523,026 B1 * | 2/2003 | Gillis ..................... 707/3 |
| 6,594,654 B1 * | 7/2003 | Salam et al. .............. 707/3 |
| 2002/0042793 A1 * | 4/2002 | Choi ...................... 707/6 |
| 2002/0107852 A1 * | 8/2002 | Oblinger ................. 707/5 |

OTHER PUBLICATIONS

Lane, Terran et al., Temporal Sequence Learning and Data Reduction for Anomaly Detection, Aug. 1999, ACM, vol. 2, No. 3, pp. 298-302.*

* cited by examiner

*Primary Examiner*—Emmanuel L. Moise
*Assistant Examiner*—Nadia Khoshnoodi
(74) *Attorney, Agent, or Firm*—Pauley Peterson & Erickson

(57) ABSTRACT

The present invention relates to a system for detecting misuse of authorized access to a digital data gathering system by a user. User behavior is monitored as to the search queries, the search results, or both. When a valid record of normal user behavior is obtained, each new query and result for the user can be compared to the record to determine if anomalous activity has occurred.

27 Claims, 2 Drawing Sheets

DETECTION OF MISUSE OF AUTHORIZED ACCESS IN AN INFORMATION RETRIEVAL SYSTEM

BACKGROUND OF THE INVENTION

1. Field of the Invention

The present invention relates to a system for detecting misuse of a digital data gathering system by an authorized user.

2. Discussion of the Related Art

As used herein, misuse is defined as use of a digital data gathering system by an authorized user which is permitted by the system but which is uncharacteristic, violates an internal security policy, or is otherwise out of the bounds of the intended use of the system.

Misuse will be distinguished from intrusion, which is prohibited behavior such as the deliberate attempt to disrupt system operations or gain access to system areas which are prohibited from access by the user. These intrusions are generally performed by people who are unauthorized, or outside of an organization, and wish to remain unidentified. The results of intrusions may be catastrophic and therefore a great deal of development has been done in the intrusion detection and prevention area.

There are two types of digital data gathering commonly in use. One, information retrieval, is concerned with the retrieval of information from unstructured data sources, such as text documents, where each element of the data is not individually defined. The user enters search terms as a data query and the unstructured data are searched for occurrence of these terms. Results of such a search may return the text, i.e., the data, a summarization, interpretation, or modification of the data or may, e.g., in a World Wide Web search, only return the location, or site, of the data. The searching of unstructured data may be wide ranging, and the potential areas of use, or types of users, may be hard to categorize so that permitted access by the user to the information retrieval system should not be unnecessarily restricted.

The second type of digital data gathering commonly in use is the structured data source search, where structured data, generally held to be identifiably correct, within one specific data source, usually privately owned and accessed, are searched to return a specific answer. Typically, the structured database uses, and users, will be easier to categorize than those of an information retrieval system.

What is needed in the art is a system whereby misuse, or potential misuse, of the digital data gathering system by authorized users, or authorized user terminals, may be flagged and if necessary, reported, without undue interference or restriction to the user or system. Such misuse detection should be reliable, unobtrusive and should not require a large amount of processing overhead when possible.

DEFINITIONS

"Query" refers herein to any form of searchable subject matter, and may include query tokens, or elements of a total query, whether aggregate or separate, unless otherwise limited or defined by the context of the disclosure.

"Data" refers herein to any form of digitally stored information, unless otherwise limited or defined by the context of the disclosure.

"Alarm" means reporting a potential misuse.

"Flag" means identifying a potential misuse.

"Database" means a logically, independently operating data storage, search, retrieval, and manipulation system.

Discussion of the modules or application routines herein will be given with respect to specific functional tasks or task groupings that are in some cases arbitrarily assigned to the specific modules for explanatory purposes. It will be appreciated by the person having ordinary skill in the art that a misuse detector according to the present invention may be arranged in a variety of ways, and implemented with software, firmware, or hardware, or combinations thereof, and that functional tasks may be grouped according to other nomenclature or architecture than is used herein without doing violence to the spirit of the present invention.

SUMMARY OF THE INVENTION

The present invention answers the above-described need for misuse detection. The embodiments herein will be presented in terms of particular information retrieval systems although the invention is not necessarily intended to be so limited. The present invention is fundamentally different from intrusion, or attack, detection because it is concerned with user behavior which is permitted by a data gathering system but which may be deemed inappropriate. The present invention is fundamentally different because intrusion detection is usually based on the tracking of operating system performance. The present invention is not so concerned with computer operating systems but is more concerned with user behavior and operates at the application level. Thus, the prior art intrusion detection systems and the present invention for misuse detection are not mutually exclusive and may be used together.

The present invention is also fundamentally different because the misuse detection system works from gathering and maintaining knowledge of the behavior of the user, rather than anticipating attacks by unknown assailants. Thus, the present invention is adapted to build and maintain a profile of the behavior of the system user through tracking, or monitoring, of user activity within the information retrieval system and to compare each new use of the information retrieval system by the user to the user profile of previous behavior on the system.

There are essentially two fields with which the present system of tracking user behavior on an information retrieval system may operate: Input, or the query of the user which is used to obtain the information; and Output, or the data/information returned and made accessible by the information retrieval system. A user's information retrieval profile, or user profile, will show certain consistencies in both the type of queries which the user poses to the system and the results of those queries, i.e., the data sources, whether structured or unstructured, which might be accessed as containing the likely answers to those queries. Based on a user profile constructed by the present system, new queries and results are compared to the user profile and rated by the present system to cause the system to flag anomalous user behavior and, when necessary, to issue an alarm that potential misuse is indicated.

Accordingly, a set of algorithms, or techniques, were developed to build a user profile and detect anomalies in user behavior compared against the user's profile which will indicate potential misuse of the data system. Each algorithm may independently flag certain anomalies. Together, the algorithms may be used to increase the likelihood of detecting a misuse. The algorithm groups are referred to herein as clustering, relevance feedback, and structured data integration.

Clustering

Clustering is a technique whereby knowledge of a user's information retrieval searches is added to the user profile in the form of a cluster index which maintains the results of the user's searches according to topics, or families, describing the information or documents returned. The returned documents are categorized or indexed to a topic structure, e.g., a family and genus structure, and the number of individual returns fitting into a particular family are counted and identified as a cluster. Individual user results should typically form clusters that are large, i.e., have many returns counted, and well defined; i.e., limited to a few topics. These few topics would normally be recognizably related to the user's search function although an automated system such as described typically need not know what the user's search function is.

Cluster indexes deviating from this pattern of large and well-defined clusters potentially indicate misuse. For information searches using databases outside the control of the organization, topics for the cluster index may be derived from the documents retrieved according to metadata from the documents using generally recognized techniques such as summarization and topic extraction. Preferably the unstructured data sources, or document collection, owned by an organization will be categorized by topic before instituting the misuse detection system, sometimes called preclustering, to cut down on processor operating overhead by enabling simple cataloging of topics into the user's cluster index. The ratio of new topics returned to old topics returned should, after a stabilization period, reveal when a user search returns anomalous results outside the user profile. These results may then be flagged and an alarm issued at a threshold ratio.

Relevance Feedback

Relevance feedback is a technique whereby those words relevant to the user's typical information retrieval queries are gathered into a user lexicon that is added to the user profile. Basic relevance feedback will build the lexicon from terms taken from those documents selected as relevant by the user or deemed relevant via automated document selection schemes when returned in response to user queries. The user may be consulted, or monitored, as to the relevance of the returned documents and terms from those documents can be added to the lexicon. The user lexicon may be constructed from query terms entered by the user or selected from terms returned with the search results, or both. Because some query engines will add synonyms to the submitted query, or return terms relevant to the query which were not initially included, e.g., the query is "English Channel tunnel" and "Chunnel" is frequently returned, the relevance feedback algorithm will add these terms to the user lexicon also, typically by resubmitting the query through the query engine to which the lexicon builder module is in communication to further refine the lexicon.

In addition, if further refinement of the user's lexicon is desired, Information Extraction tools as known in the art, such as WhizBang! Labs' Extraction Framework, BBN's Identifier, or SRA's NetOwl, may be used to identify nouns referencing people, locations, and organizations in returned data text. In this form of extraction based relevance feedback, these terms, sometimes called entity terms, can then be extracted from the returned data text and resubmitted with the original query to place the entity terms in the user's lexicon according to the lexicon builder operation, either singly or in combination with the other lexicon building techniques.

After a stabilization period in which a valid lexicon is developed representing typical user behavior, each new query submitted by the user will have the query terms or the key terms of the returned data, or both, compared to the lexicon. Anomalous or infrequent query terms used, or returned with search results, or a threshold ratio of such query terms or results to typically used terms stored in the lexicon, may then be flagged or reported as an indication of potential misuse.

Structured Data Integration

Structured data integration is a technique whereby structured data sources providing information on the user are integrated into the misuse detection system. For example, a vacation schedule database may be utilized to flag any data search activity performed by a user when the vacation schedule indicates that the user should be inactive.

Also, the structured data sources accessed by a user should show definite patterns. For structured data source queries performed by the user, the results of those queries may also be monitored and cataloged to be added to the user profile, such as in a structured data lexicon, with the anomalous or infrequent usages or data returns being subject to operable numerical or ratio thresholds similar to the result set clustering and relevance feedback techniques.

Each of the techniques described above may be used singly or in various combinations. For example, an alarm might not be presented until each of the three techniques has indicated, or flagged, a potential misuse. If combined, the techniques could also be weighted or scaled according to a relative importance for a given employee classification.

DETAILED DESCRIPTION OF THE PREFERRED EMBODIMENT

Figure 1:
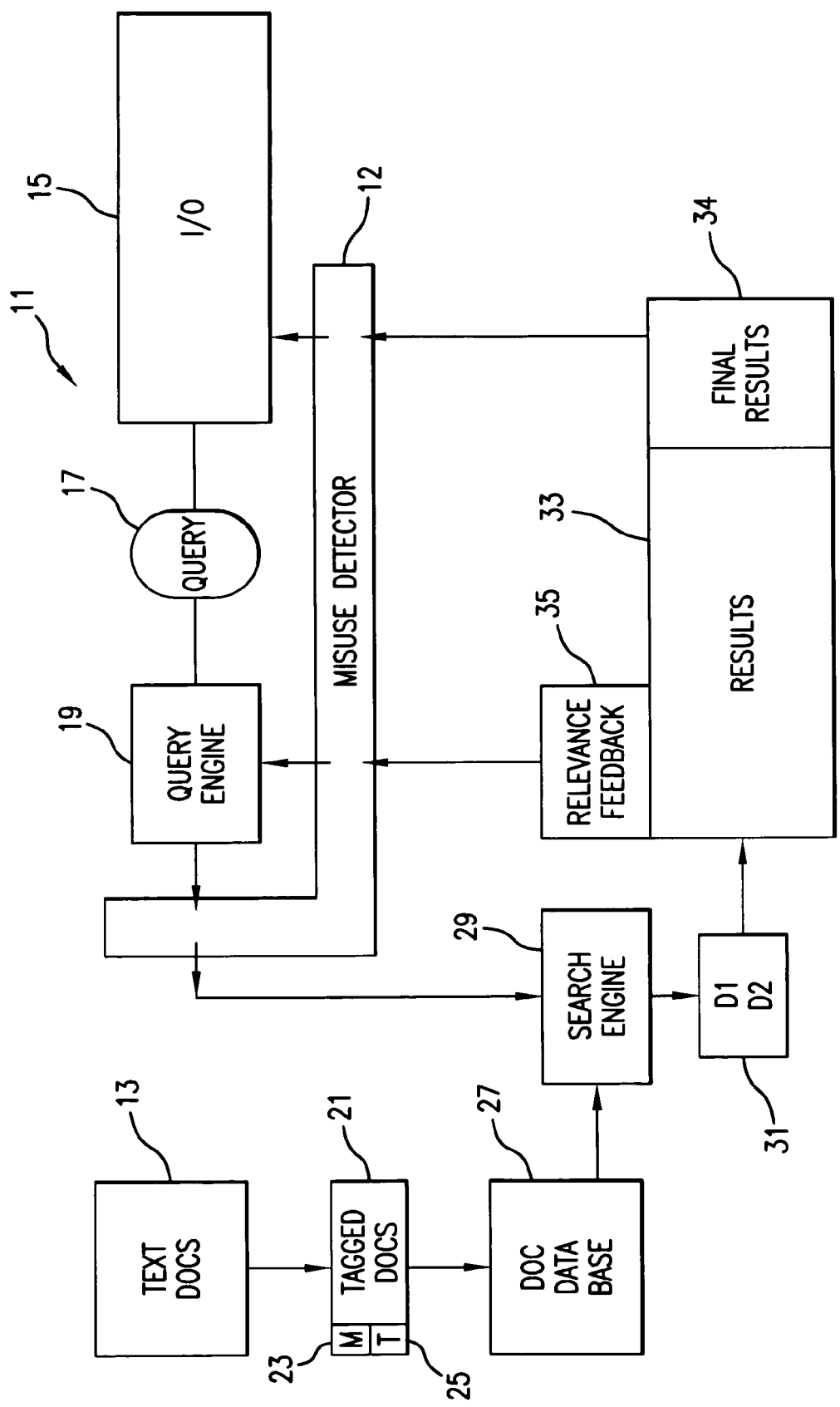
FIG. 1 shows a typical information retrieval system with a misuse detector of the present invention integrated therein.

Referencing FIG. 1, a representative information retrieval system 11 illustrates a searchable document collection 13, which is accessed via an input/output (I/O) interface 15 by a user query 17. A query engine 19 transforms, parses, or may otherwise manipulate the query into its component parts through various techniques as known in the art such as parsing, term extraction, and stop-word removal. The misuse detector 12 of the present invention is in communication with the query engine 19 as further explained below.

The document collection 13 as known in the art is assembled by any of numerous information retrieval techniques into a searchable format 21 with each document generally having a heading descriptor of metadata 23 for the document plus the searchable text field 25. The document collection is ultimately assembled by known techniques into a document storage structure, or database, 27, e.g., as parsed documents, an inverted index, signature files, compressed sparse matrix, etc., for comparison to the query terms by a search engine 29. The search engine 29 reproduces a ranked list of documents 31 which are communicated to the results manager module 33. The results manager module 33 may return the ranked list of documents as final results 34 to the misuse detector 12 and then to the I/O module 15 or may search the documents for terms with a relevance feedback engine 35 and resubmit the relevant additional terms to the query engine 19, as further explained below. The results manager module 33 further submits the additional results to the misuse detector 12 as explained below.

Figure 2:
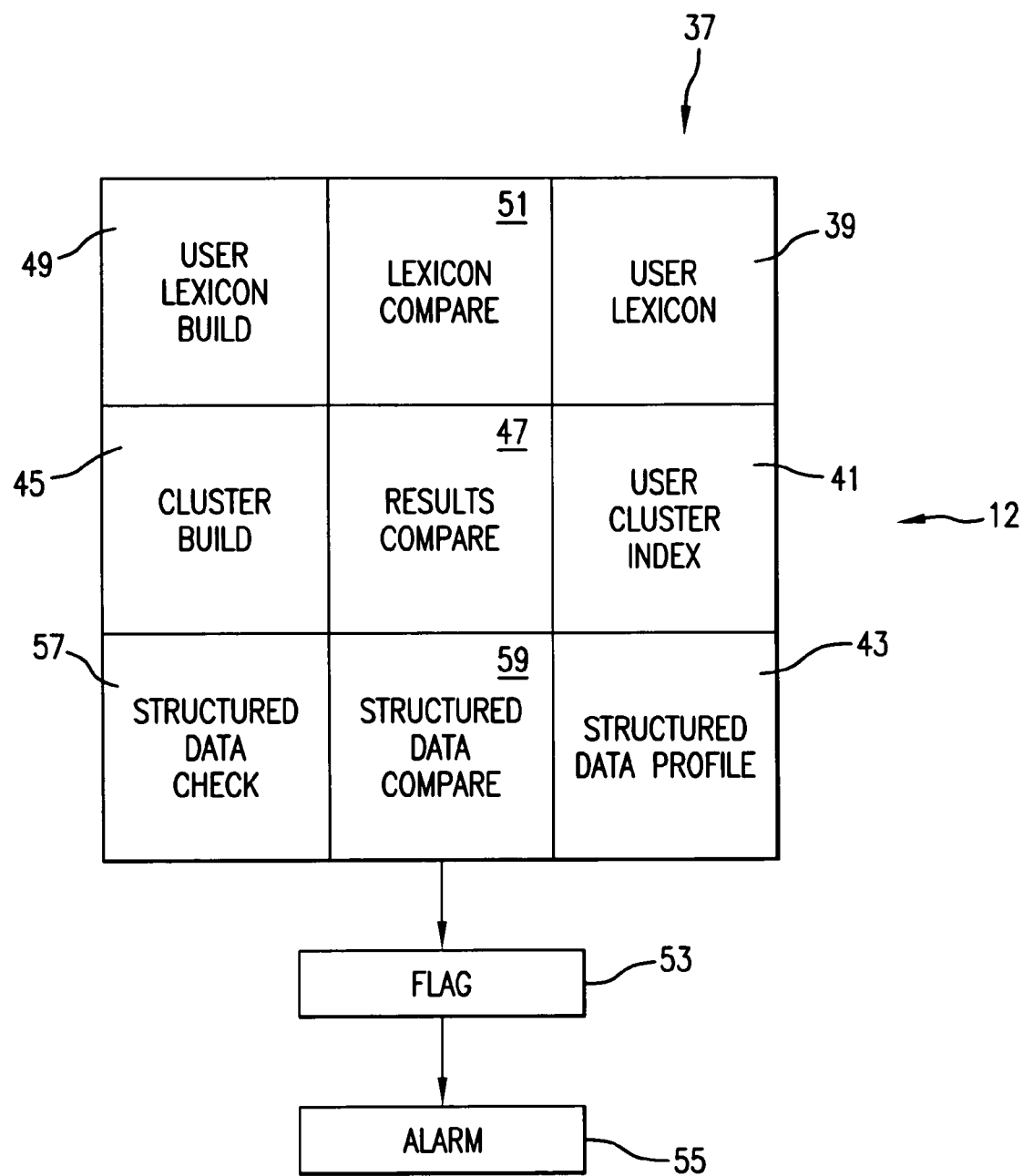
FIG. 2 shows the misuse detector functional block with its various components.

As seen in FIG. 2, the functional module for the misuse detector 12 consists of a user profile 37 including the profile subsets of a user lexicon 39, a cluster index 41, and a structured data profile 43. Each profile subset will be used with a different detection algorithm component of the misuse detector 12.

Clustering

Individual user search results should be able to be categorized by family/genus relationships into large and well-defined clusters of such families. Two clustering algorithms of the present invention make use of this fact. They are referred to herein as preclustering and result set clustering. Both clustering techniques share similarities whereby the collected output of a user's information retrieval searches are added by a cluster-building module 45 to the user profile in the form of a cluster index 41. Preclustering identifies documents retrieved and read outside of the predefined clusters most frequently accessed by the user. Result set clustering identifies, or builds, clusters based on the user's information retrieval habits and warns of results that do not fit into the identified clusters.

In the instances where an organization has a sizeable in-house document collection, the unstructured data sources, or document collection, of an organization can be pre-categorized into various family and genus groupings for misuse detection in a technique referred to herein as preclustering. This is especially true where reliable data on the information retrieval habits or patterns of identifiable groups of users are available to help define the hierarchical relationships of the information typically searched. Known commercially available or individually modified clustering algorithms such as the buckshot, single-pass, or hierarchical approaches can accomplish this. Then, based upon the documents accessed, or read, by the user, a cluster index identifying the most frequently accessed clusters is constructed. Comparison of documents read by the user outside of the most frequently accessed clusters can then be identified as anomalies and used to detect misuse.

An algorithmic pseudocode expression of a method for using Preclustered Documents for misuse is:

a) Cluster the document collection.

b) For any document read by the user, track the cluster from which the document originates.

c) Over time, build a profile of the user based on the user's most frequently accessed clusters.

d) After a confidence threshold is reached where the system can be confident of the user's profile, track the number of times a user retrieves and reads a document outside of the most frequently accessed clusters.

e) Establish a misuse threshold number for documents read outside of the most frequently accessed clusters and, after the misuse threshold is obtained, signal a systems administrator that a potential misuse may have occurred.

The result set clustering algorithm shares the cluster-building module 45 that identifies the documents retrieved, that is, the search results, to their family and genus and tracks the frequency of the occurrence of the family/genus to identify clusters of like retrieval activity and build clusters into the cluster index 41. The cluster occurrences should fall into large and well-defined groupings or clusters. For example, a car researcher should accumulate large clusters under the families DetroitCAR, JapanCAR, KoreaCAR, and the genera, Ford, Honda and Hyundai, respectively. Several small clusters, such as Easter Islands, Cayman Islands, and Falkland Islands, would be anomalies unrelated in topical organization to cars and may indicate a misuse.

An algorithmic pseudocode expression of a method for using result set clustering for misuse is:

a) Retrieve documents in response to queries.

b) Cluster the results.

c) After a threshold of results is obtained, check the size of the clusters. Denote clusters of large enough size as valid clusters.

d) If a sufficient number of documents do not participate in any valid cluster, sound an alarm.

In instances where a user often searches outside of the in-house document collection the clustering algorithm includes a functionality wherein the information retrieval results of the user are categorized by the metadata or top weighted text words available with returned results which were not previously classified and new clusters may be built into the index. Again, any clustering algorithm, including those similar to the clustering algorithms as mentioned herein, can be used.

Under operation of the result set clustering algorithm, each time a user submits a new information retrieval query, the cluster or clusters identifying the document sources returned as containing possible answers to the query are cataloged by the cluster building module 45 into the user's cluster index 41. Numerous clustering algorithms and techniques are known to exist, such as hierarchical cluster and single pass clustering, some of which use seed documents to generate related clusters. A cluster index identifying the family and genus groupings typically returned in response to the user's queries is then built for the user.

After a stabilization period, that is, a time sufficient to establish a valid statistical threshold for family and genus clusters according to user search results, a results comparison function 47 will be instituted to compare the family/genus identifiers of each new search result against the cluster index. If the results begin falling outside of the large clusters in the index 41, the results are flagged 53 as anomalous. If the ratio of anomalous results to large clusters goes up, i.e., new little clusters are forming or getting bigger, an alarm 55 may be sent to notify system security.

The index cluster 41 may be a list of clusters with a numerical count of returns, or may be constructed according to custom designed algorithms to indicate hierarchical families and genera of clusters and relationships between clusters. Processing power is preferably kept to a minimum by simple comparison of each query result with the user's cluster profile. Anomalous or infrequent cluster returns may be flagged or produce an alarm, or a threshold ratio of new clusters to expected clusters may be reported as an indication of potential misuse.

Relevance Feedback

Relevance feedback is a technique whereby those words most relevant to the user's typical information retrieval queries are gathered into a user lexicon 39 that is added to the user profile 37 through a lexicon-building module 49. Two relevance feedback algorithms of the present invention make use of this fact. They are referred to herein as basic relevance feedback and extraction based relevance feedback. Relevance feedback starts with an original query and gradually improves it based on user feedback. The technique used is to take an original query from the user and obtain a list of documents. At this point, either the user is consulted to determine, or to select, which documents are relevant and which are non-relevant or via an automated ranking means documents are deemed relevant or non-relevant. Terms from the relevant documents are added to the query, or if they already exist their weight is increased. Terms from non-relevant documents are either removed or their weight is reduced. The query is then re-executed.

The user lexicon 39 may be constructed according to the basic relevance feedback algorithm from query terms entered by the user, or selected from a rated scale of weighted terms returned with the retrieved document metadata, or both. Because some query engines 19 will add synonyms to the submitted query, or return terms relevant to the query which were not initially included, e.g., the query is "English Channel tunnel" and "Chunnel" is frequently returned, the relevance feedback algorithm will add these terms to the user lexicon 39 also, typically by resubmitting the query through the query engine 19 with which the lexicon building module 49 communicates. Ultimately a small lexicon of terms appropriate for a given user can be identified.

An algorithmic pseudocode expression of a method for using basic relevance feedback for misuse is:

a) Identify top weighted terms from documents retrieved by the user as feedback terms. Store these in a user-specific lexicon.

b) Track user activity until the lexicon of query terms and feedback terms stabilizes. Eventually, the number of new terms added to the lexicon will form a user profile. This should follow the well-studied trend that as documents are added to a system, the rate of new terms eventually slows.

c) For each new query, identify if the query terms or the feedback terms are in the lexicon. Track the ratio of new terms to existing terms.

d) If the ratio of new terms to old terms exceeds a threshold, send an alarm to the systems administrator.

In addition, if further refinement of the user lexicon 39 is desired according to extraction based relevance feedback, Information Extraction tools having parsers, or taggers, as known in the art, for example, WhizBang! Labs' Extraction Framework, BBN's Identifier, or SRA's NetOwl, may be used. The document words are parsed, or tagged, to identify the types of word components, e.g., action verbs or proper nouns referencing various entities, in returned data text. Particular words, or types of words, or both, by way of example the "entity terms", can then be extracted by the Information Extraction tools from the returned data text and resubmitted with the original query to place the entity terms in the user's lexicon 39 according to the lexicon builder operation 49 either singly or in combination with the other lexicon building techniques.

A valid lexicon is established after a stabilization period from the first query has elapsed or an otherwise statistically significant sampling is obtained of the user's information retrieval habits. The exact duration, in terms of the number of terms or phrase processed is domain, language, and application dependent and does not detract from the essence of this disclosed invention.

An algorithmic pseudocode expression of a method for using extraction based relevance feedback for misuse is:

a) Documents are tagged with an existing parser (or tagger) to identify word/phrase document components by type.

b) The original query of only terms and phrases is run for pass one (as is done for conventional relevance feedback).

c) A second query pass selects, or extracts, entities from the most relevant documents and adds these terms to the query as in relevance feedback. The parser (or tagger) is used as an extra filter in the relevance feedback process.

The information retrieval queries used to search the unstructured data sources, or document collection, can also be monitored for each user to be used in developing the lexicon. As is known to the person having ordinary skill in the art of information retrieval, queries are parsed into elements in a variety of ways such as terms, phrases, etc. These elements may then be used to help develop the lexicon for the user which contains the user's most typically used search terms, or all terms with an indication of frequency.

After the valid lexicon is developed, each new query submitted by the user will have the query terms or the key terms of the returned data, or both, compared to the lexicon by a lexicon comparison module 51. Anomalous or infrequent query terms used, or results returned, or a threshold ratio of such query terms or results to the typically used terms in the lexicon, may then be flagged 53 or reported as an alarm 55 of potential misuse.

Structured Data Integration

Structured data integration is a technique whereby structured data sources providing information on the user can be integrated automatically into the misuse detection system by a structured data check module 57 to compare the digital data gathering results, or any activity, of the user to the structured data profile to determine whether the digital data gathering results, or activities, are congruent with what is known about the employee through the structured data profile. For example, using a structured data comparison module 59, a vacation schedule database can be utilized to detect and flag 53 any data search activity performed by a user when the vacation schedule indicates that the user should be inactive. As another example, employee classification codes may also be integrated into the misuse detection system to inform or further automate the misuse notification system. For instance, employees of a certain security classification, or current job assignment, may be identified as more, or less, likely to trigger a misuse notification based on anomalous results or entries into certain data libraries. As another example, an employee's time sheet, or even the time of the query, can provide triggers for a misuse notification alarm 55 as part of the detection algorithm.

An algorithmic pseudocode expression of a method for using this form of structured data integration for misuse is:

a) Identify structured data sources that can be used to identify what the user is working on.

b) Query these sources and, for each source, map the structured result into a lexicon of terms and phrases that indicate valid user activity.

c) For each new query, track the ratio of terms found in the lexicon to those not found in the lexicon.

d) If this ratio exceeds a threshold, send an alarm to the systems administrator.

Also, the structured data sources accessed by a user should show definite patterns. Structured data source queries performed by the user, or results of those queries, may also be monitored and cataloged to be added to the user profile or lexicon, with the anomalous or infrequent usages or data returns being subject to operable numerical or ratio thresholds similar to the result set clustering and relevance feedback techniques.

An algorithmic pseudocode expression of a method for using this form of structured data integration for misuse is:

a) Identify structured data sources that can be used to identify what the user is working on.

b) Query these sources and, for each source, map the structured result into a lexicon of terms and phrases that indicate valid user activity.

c) For each new query, retrieve the relevant documents for a query.

d) Extract the key terms from these documents.

e) Identify the ratio of key retrieved terms found in the lexicon to those not found in the lexicon.

f) If this ratio exceeds a threshold, send an alarm to the systems administrator.

Each of the techniques described above may be used singly or in various combinations. For example, an alarm might not be presented until each of the three techniques has indicated a potential misuse. If combined, the techniques could also be weighted or scaled according to a relative importance for a given employee classification.

Having thus described a misuse detector for monitoring user behavior to determine if misuse of authorized access to a data gathering system is occurring; it will be appreciated that many variations thereon will occur to the artisan of ordinary skill upon an understanding of the present invention, which is therefore to be limited only by the appended claims.

We claim:

1. A method for identifying the misuse of authorized access to a digital data gathering system by a user, comprising:
   monitoring a content of digital data gathering results of the user, wherein the content includes at least one of words and phrases;
   constructing a user lexicon for the user of the digital data gathering system;
   wherein the user lexicon comprises a list of a plurality of words or phrases gathered from documents of the digital data gathering results of the user;
   monitoring a further content of further digital data gathering results obtained by the user;
   comparing words or phrases of the further content to the user lexicon to determine anomalies in the further digital data gathering results; and
   identifying a potential misuse when an anomaly is detected.

2. The method according to claim 1, further comprising:
   determining a ratio of anomalies to the words or phrases in the lexicon; and
   reporting a potential misuse when the ratio exceeds a predetermined threshold.

3. The method according to claim 1, wherein the user lexicon comprises a list of words or word strings identifying nouns extracted from documents retained in response to user queries.

4. The method according to claim 1, further comprising:
   constructing a structured data profile for the user of the digital data gathering system;
   wherein the structured data profile comprises a list of data identifying employment characteristics of the user;
   comparing the further digital data gathering results of the user to the structured data profile to determine whether the further digital data gathering results correspond with the structured data profile; and
   identifying a potential misuse when the further digital data gathering results do not correspond with the structured data profile.

5. A method for identifying a misuse of an authorized user of an information retrieval system, the method comprising:
   monitoring a content of at least one of queries entered by the user and digital data gathering results obtained by the user, wherein the content includes at least one of terms, phases, and topics;
   constructing a profile of use for the user using the content;
   monitoring a further content of at least one of a further query entered by the user and further digital data gathering results obtained by the user;
   comparing the further content to the profile of use to determine whether the at least one of the further query entered by the user and the further digital data gathering results is an anomaly;
   identifying a potential misuse when an anomaly is detected.

6. The method according to claim 5, wherein the profile of use comprises a user lexicon of user result words or phrases, a user cluster index of result document topic categories, and a structured data profile of known user characteristics, and further comprising:
   comparing the further content to each of the user lexicon of user result words or phases, the user cluster index, and the structured data profile.

7. The method according to claim 6, further comprising: weighting anomalies identified according to the user lexicon, the user cluster index, and the structured data profile to determine a report of potential misuse.

8. The method according to claim 6, further comprising: sending a notification of potential misuse when an anomaly is identified according to two or more of the user lexicon, the user cluster index, and the structured data profile.

9. The method according to claim 6, wherein the user lexicon comprises a list of words or phrases gathered from metadata of documents returned in the query results.

10. The method according to claim 6, wherein the user lexicon comprises a list of words, or types of words, or both, extracted from documents returned in the query results.

11. The method according to claim 6, wherein the user cluster index comprises a list of families of topic data to which the data of the user information retrieval results have been categorized.

12. The method according to claim 5, further comprising:
    constructing a user cluster index for the user;
    wherein the user cluster index comprises a list of families of data to which data from the digital data gathering results of the user were categorized;
    monitoring families of the further digital data gathering results of the user; and
    comparing the families of the further digital data gathering results of the user to the user cluster index to determine anomalies in the digital data gathering results.

13. The method according to claim 12, further comprising:
    comparing the anomalies to the user cluster index to determine the ratio of anomalies to existing clusters; and
    reporting a potential misuse when the ratio exceeds a predetermined threshold.

14. The method according to claim 12, further comprising:
    constructing a user lexicon for the user;
    wherein the user lexicon comprises a list of words at phrases gathered from the digital data gathering results of the user; and
    comparing words or phrases gathered from the further digital data gathering results to the user lexicon to determine anomalies in the digital data gathering results.

15. The method according to claim 14, wherein the user lexicon further comprises a list of words or phrases gathered from the monitoring of the queries; and
    comparing the further content of the further query to the user lexicon to determine any anomaly by the further query.

16. The method according to claim 14, further comprising:
    determining a ratio of anomalies to words or phrases in the lexicon; and
    reporting a potential misuse when the ratio exceeds a predetermined threshold.

17. The method according to claim 14, wherein the user lexicon comprises a list of words or word strings identifying particular words or types of words, or both, extracted from documents returned in response to user queries.

18. The method according to claim 14, further comprising:
    constructing a structured data profile for the user;
    wherein the structured data profile comprises a list of data identifying employment characteristics of the user;
    comparing the further digital data gathering results of the user to the structured data profile to determine whether the further digital data gathering results are congruent with the structured data profile; and
    identifying a potential misuse when the further digital data gathering results are not congruent with the structured data profile.

19. The method according to claim 12, further comprising:
    constructing a structured data profile for the user;
    wherein the structured data profile comprises a list of data identifying employment characteristics of the user;
    comparing the further digital data gathering results of the user to the structured data profile to determine whether the further digital data gathering results are congruent with the structured data profile; and
    identifying a potential misuse when the digital data gathering results are not congruent with the structured data profile.

20. The method according to claim 19, wherein the structured data profile comprises a structured data profile lexicon of terms and phases indicating valid user activity.

21. A method for identifying the misuse of authorized access to a digital data gathering system by a user, comprising:
    constructing a structured data profile for the user of the digital data gathering system;
    wherein the structured data profile comprises a list of data identifying employment information of the user;
    monitoring digital data gathering results of the user;
    comparing digital data gathering results of the user to the structured data profile to determine whether the digital data gathering results correspond with the structured data profile; and
    identifying a potential misuse when the digital data gathering results do not correspond with the structured data profile.

22. A method for detecting misuse by a user of an information retrieval system having a document collection, wherein documents of the document collection are categorized into one of a plurality of clusters according to topic, the method comprising:
    tracking the one of the plurality of clusters from which any document read by the user originates;
    building up a profile of use for the user based on most frequently accessed clusters;
    tracking each time the user retrieves and reads a document outside of the most frequently accessed clusters; and
    establishing a misuse threshold number for documents read outside of the most frequently accessed clusters and after the misuse threshold number is obtained, signaling that a potential misuse may have occurred.

23. A method for detecting misuse by a user of an information retrieval system having a document collection, comprising the steps of:
    retrieving documents in response to user queries;
    clustering the retrieved documents into clusters by category based upon a content of each of the retrieved documents, wherein the content includes at least one of terms, phrases, and topics;
    establishing and obtaining a threshold number of retrieved documents and after the threshold number of retrieved documents is obtained, determining a size for each of the clusters, and further denoting clusters having at least a predetermined size as valid clusters; and
    determining if a predetermined number of retrieved documents do not participate in any of the valid clusters and if not, signaling that a potential misuse may have occurred.

24. A method for detecting misuse by a user of an information retrieval system having a document collection, comprising the steps of:
    identifying top weighted terms from documents retrieved by the user from searches of the document collection and storing the top weighted terms in a user-specific lexicon;
    tracking user activity until the rate of new terms added slows and the user-specific lexicon stabilizes to form a user profile;
    identifying for each new query, if the top weighted terms are in the user-specific lexicon;
    tracking a ratio of newly occurring terms to terms existing in the user-specific lexicon; and
    if the ratio of newly occurring terms to existing user-specific lexicon terms exceeds a threshold, signaling that a potential misuse may have occurred.

25. The method according to claim 24, further comprising:
    tagging the documents to identify words in the documents by type;
    running an original query of terms and phrases;
    selecting specific types of words from relevant documents retrieved by the original query and adding these terms to a second query; and
    iteratively selecting specific types of words from relevant documents retrieved by each query and adding the selected specific types of words to a further query to filter the user-specific lexicon.

26. A method for detecting misuse by a user of an information retrieval system having a document collection, comprising the steps of:
    identifying structured data sources that are used to identify what the user is working on;
    querying these sources and, for each source, mapping a structured result into a structured data lexicon of terms and phrases that indicate valid user activity;
    for each new query, tracking a ratio of terms found in the structured data lexicon to those not found in the structured data lexicon; and
    if the ratio exceeds a threshold, signaling that a misuse may have occurred.

27. A method for detecting misuse by a user of an information retrieval system having a document collection, comprising the steps of:
    identifying structured data sources that are used to identify what the user is working on;

querying the identified structured data sources and, for each source queried, mapping a structured result into a structured data lexicon of terms and phrases that indicate valid user activity;

for each new query, retrieving relevant documents for that new query;

extracting key terms from the relevant documents;

identifying the ratio of key retrieved terms found in the lexicon to those not found in the lexicon; and if the ratio exceeds a threshold, signaling tat a misuse may have occurred.

\* \* \* \* \*